United States Patent
Cirino et al.

Patent Number: 6,012,029
**Date of Patent: *Jan. 4, 2000**

[54] VOICE ACTIVATED SYSTEM FOR LOCATING MISPLACED ITEMS

[76] Inventors: Sepideh S. Cirino, 27 Pheasant La., Aliso Viejo, Calif. 92565; Michael A. Hreha, 410 W. Stevens Ave., #A, Santa Ana, Calif. 92707

[*] Notice: This patent issued on a continued prosecution application filed under 37 CFR 1.53(d), and is subject to the twenty year patent term provisions of 35 U.S.C. 154(a)(2).

[21] Appl. No.: 08/536,126

[22] Filed: Sep. 29, 1995

[51] Int. Cl.$^7$ .................................................. G10L 3/00
[52] U.S. Cl. ................................... 704/275; 704/272
[58] Field of Search ................................. 395/2.84, 2.82, 395/2.81, 2.83, 2.79; 704/275, 273, 272, 274, 270, 200

[56] References Cited

U.S. PATENT DOCUMENTS

| | | | |
|---|---|---|---|
| 4,081,747 | 3/1978 | Meyerle | 325/37 |
| 4,101,873 | 7/1978 | Anderson et al. | 340/539 |
| 4,208,654 | 6/1980 | Vogt et al. | 340/351 |
| 4,366,482 | 12/1982 | Remes et al. | 340/835 |
| 4,408,096 | 10/1983 | Washizuka et al. | 381/107 |
| 4,421,319 | 12/1983 | Murphy | 273/416 |
| 4,426,733 | 1/1984 | Brenig | 455/79 |
| 4,476,469 | 10/1984 | Lander | 340/825 |
| 4,529,980 | 7/1985 | Liotine et al. | 340/825 |
| 4,641,292 | 2/1987 | Tunnell et al. | 367/198 |
| 4,725,827 | 2/1988 | Gallegos, Jr. et al. | 340/696 |
| 4,771,283 | 9/1988 | Imoto | 340/825 |
| 4,792,796 | 12/1988 | Bradshaw et al. | 340/539 |
| 4,999,613 | 3/1991 | Williamson et al. | 340/573 |
| 5,049,867 | 9/1991 | Stouffer | 340/426 |
| 5,054,082 | 10/1991 | Smith et al. | 395/2.79 |
| 5,126,719 | 6/1992 | DeSorbo | 340/571 |
| 5,132,660 | 7/1992 | Chen et al. | 340/428 |
| 5,199,080 | 3/1993 | Kimura et al. | 381/110 |
| 5,204,657 | 4/1993 | Prosser et al. | 340/568 |
| 5,278,556 | 1/1994 | Oh | 340/988 |
| 5,294,915 | 3/1994 | Owen | 340/539 |
| 5,371,901 | 12/1994 | Reed et al. | 455/69 |
| 5,402,104 | 3/1995 | LaRosa | 340/539 |

*Primary Examiner*—Richemond Dorvil
*Attorney, Agent, or Firm*—Blakely, Sokoloff, Taylor & Zafman LLP

[57] ABSTRACT

A voice-activated location system comprising a transmitter unit and a receiver unit coupled to a frequently misplaced item. The transmitter unit receives an audible sound, generates an analog signal corresponding to the audible sound and transmits a coded radio frequency ("RF") carrier signal upon recognizing that the audible sound represents a voice command. The carrier receives the coded RF carrier signal, decodes the coded RF carrier signal to produce a serial bit stream. The serial bit stream is compared with a digital code associated with the receiver unit. If there is a match, the receiver unit emits an audible sound for a predetermined time period to assist in locating the item.

20 Claims, 8 Drawing Sheets

VOICE ACTIVATED SYSTEM FOR LOCATING MISPLACED ITEMS

BACKGROUND OF THE INVENTION

1. Field of the Invention

The present invention relates to the field of wireless data communications. More particularity, the present invention relates to a voice-activated location system for locating misplaced items.

2. Description of Art Related to the Invention

It is well-known that there are a number of electronic devices (e.g., televisions, video cassette recorders, stereo components like compact disk players, etc.) which are controlled by a remote control unit. Typically, these remote control units transmit infrared or radio frequency ("RF") signals upon depressing a control button on the remote control unit. The electronic device receives the infrared or RF signal and, in response, performs an operation associated with the control button such as lower its volume, change a channel, begin to record a television show and the like. Albeit that remote control units are a luxury for many persons, they are virtually essential to persons suffering from physical disabilities.

Unfortunately, due to their small size and normally dark colored casing, remote control units are frequently lost or misplaced. Currently, at least one known company sells a television set with a transmitter integrated therein to locate its misplaced remote control unit. However, this transmitter cannot be activated remotely to account for those instances in which persons are not physically able to reach the television set. In addition, the transmitter is dedicated for locating only the remote control unit, not other misplaced items which are likely to become lost or misplaced such as, for example, keys, eyeglasses and other small important items. Thus, it would be desirous to produce a voice-activated location system which overcomes the above-discussed disadvantages.

BRIEF SUMMARY OF THE INVENTION

The present invention relates to an electronic voice-activated location system comprises a voice controlled, speaker independent transmitter unit and a receiver unit. The transmitter unit monitors audio sounds in an effort to detect a voice command spoken by an individual seeking the location of a misplaced item having the receiver unit. Upon detecting the voice command, the transmitter unit produces a radio frequency ("RF") carrier signal encoded with a "code" which operates like an address identifying the voice command and outputs the coded RF carrier signal to the receiver unit.

The receiver unit is attached to or integrated within a TV/VCR remote control, set of keys, or any object that is frequently misplaced, to aid in locating the misplaced item. In response to receiving a coded RF carrier signal consistent with its assigned code, the receiver unit emits an audible tone to assist a person to locate the misplaced object.

BRIEF DESCRIPTION OF THE DRAWINGS

The features and advantages of the present invention will become apparent from the following detailed description of the present invention in which.

DETAILED DESCRIPTION OF THE INVENTION

The present invention relates to a voice-activated location system and its associated method of operation directed to locating a number of misplaced items. In the following description, numerous details of the present invention, such as specific components integrated therein, are set forth in order to provide a thorough understanding of the present invention. It will be obvious, however, to one of ordinary skill in the art that these details are not required to practice the present invention. Moreover, in some instances, well-known circuits, operation steps and the like are not set forth in detail in order to avoid unnecessarily obscuring the present invention.

Figure 1:
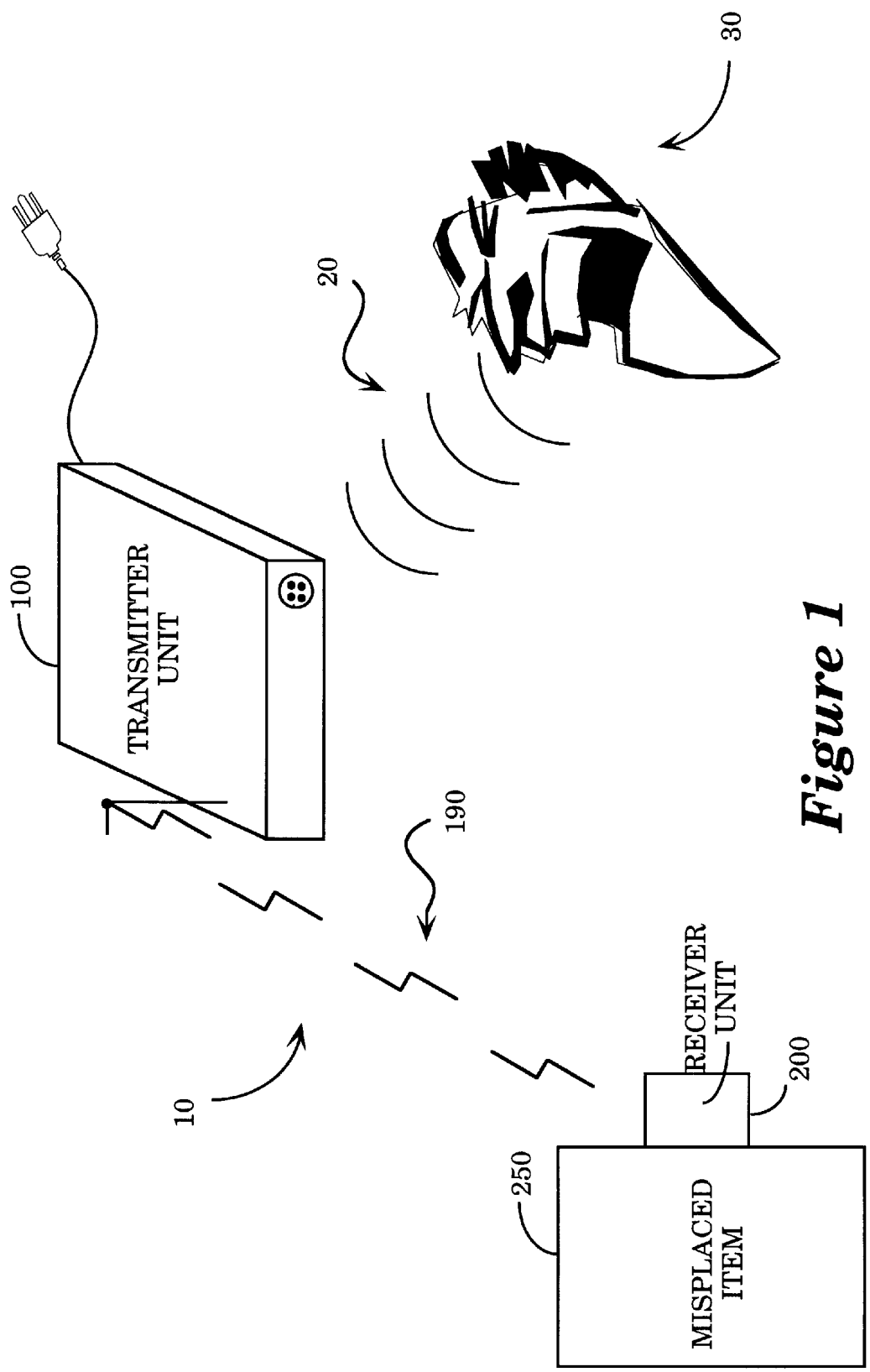
FIG. 1 is a simplified block diagram of a voice-activated location system featuring a voice controlled, speaker independent, operator interacting transmitter unit and a corresponding receiver unit.

Referring to FIG. 1, a simplified embodiment of the voice-activated location system is illustrated. The voice-activated location system 10 comprises a transmitter unit 100 and a receiving unit 200. Preferably, the transmitter unit 100 is situated in a generally quiet environment to allow it to detect voice commands 20 spoken by an individual 30. A "voice command" is one key word or preferably a number of key words spoken in succession recognized by the transmitter unit 100. Upon recognizing that a particular voice command was recently spoken, the transmitter unit 100 transmits a coded radio frequency ("RF") carrier signal 190 with the receiver unit 200 as its destination. The receiver unit 200, attached to a frequently misplaced item 250 (e.g., TV/VCR remote, keys, etc.) as shown or integrated within the item 250, is configured to (i) determine whether that coded RF carrier signal is directed to the receiver unit 200 or to another receiver unit (not shown) and (ii) emits an audible tone upon receiving its particular coded RF carrier signal.

Figure 2:
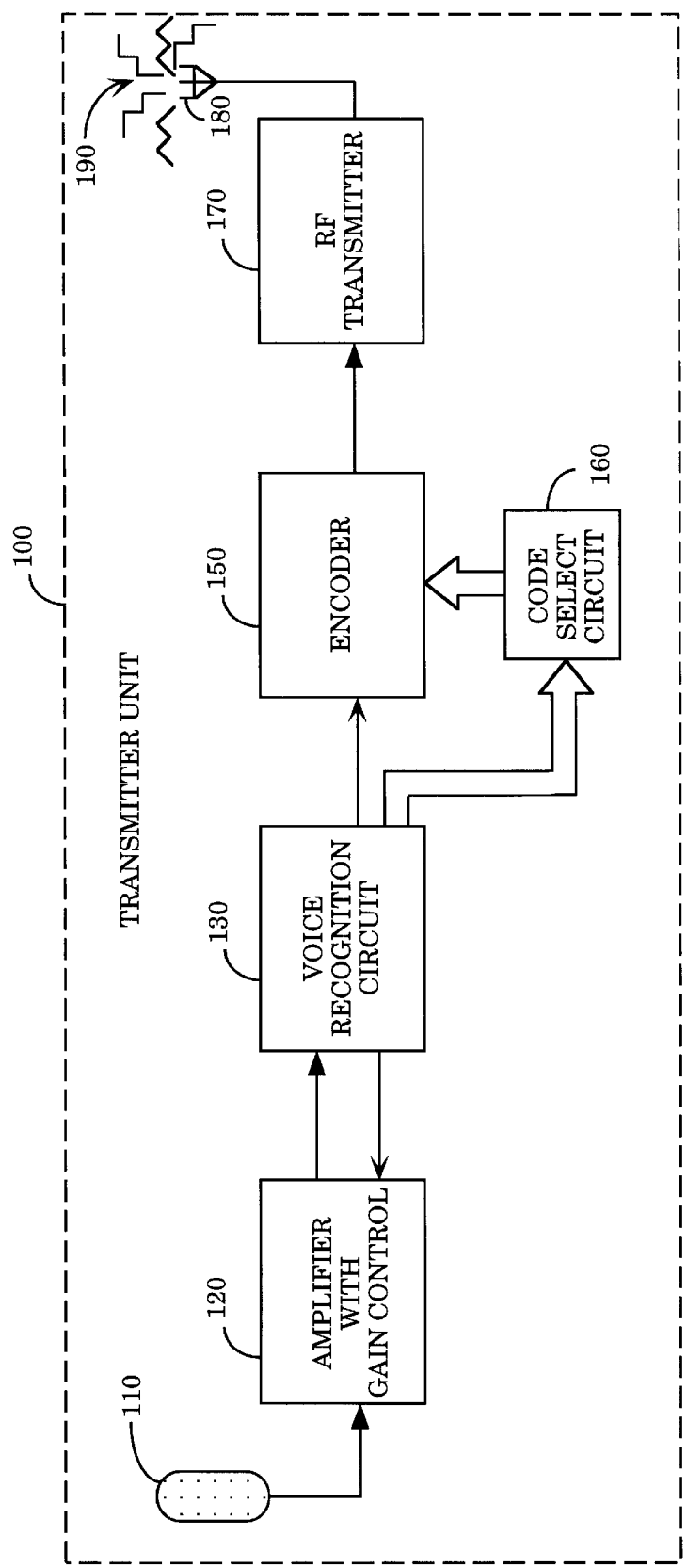
FIG. 2 is an illustrative block diagram of the transmitter unit of FIG. 1 including a microphone, amplifier, voice recognition circuit, encoder, code select circuit and radio frequency ("RF") transmitter.

Referring now to FIG. 2, an illustrative embodiment of the transmitter unit 100 of FIG. 1 is shown. The transmitter unit 100 comprises a microphone 110, an amplifier 120, a voice recognition circuit 130, an encoder 150, a code select circuit 160, a radio frequency ("RF") transmitter 170 and an antenna 180. As shown, the microphone 110 receives a voice command and transforms the voice command into an electrical varying "analog" signal being a function of the voice command. Thereafter, the analog signal is transferred into the amplifier 120.

The amplifier 120 amplifies the analog signal and transfers the amplified analog signal into the voice recognition circuit 130. Concurrently, the voice recognition circuit 130 is able to generate an automatic gain control voltage which is fed back into the amplifier 120 to maintain the amplified analog signal at a reasonably constant level. The variation in gain is to accommodate for differences in loudness of the voice command to provide better reliability in its signal analysis.

The voice recognition circuit 130 receives the amplified analog signal and transmits a control output code into the code select circuit 160 upon recognizing that the voice command is one of many voice commands supported by the voice recognition circuit 130. More specifically, the voice recognition circuit 130 digitizes the amplified analog signal to produce a resulting digital signal. The digital signal is compared with a number of recognized voice commands internally stored within the voice recognition circuit 130. If there is a match, the control output code is transmitted into the code select circuit 160.

The code select circuit 160 uses the control output as select signals to choose which of a number of digital codes to output from the code select circuit 160 to the encoder 150. Concurrently, the voice recognition circuit 130 transmits an enable signal into the encoder 150 prompting the encoder 150 to receive the digital code in parallel from the code select circuit 160. The encoder 150 converts the digital code into a serial bit stream and transmits the serial bit stream to the RF transmitter 170. The RF transmitter 170 converts the serial bit stream into a frequency modulated ("FM") RF carrier signal 190. The FM RF carrier signal is transmitted in all directions surrounding the antenna 180.

Figure 3:
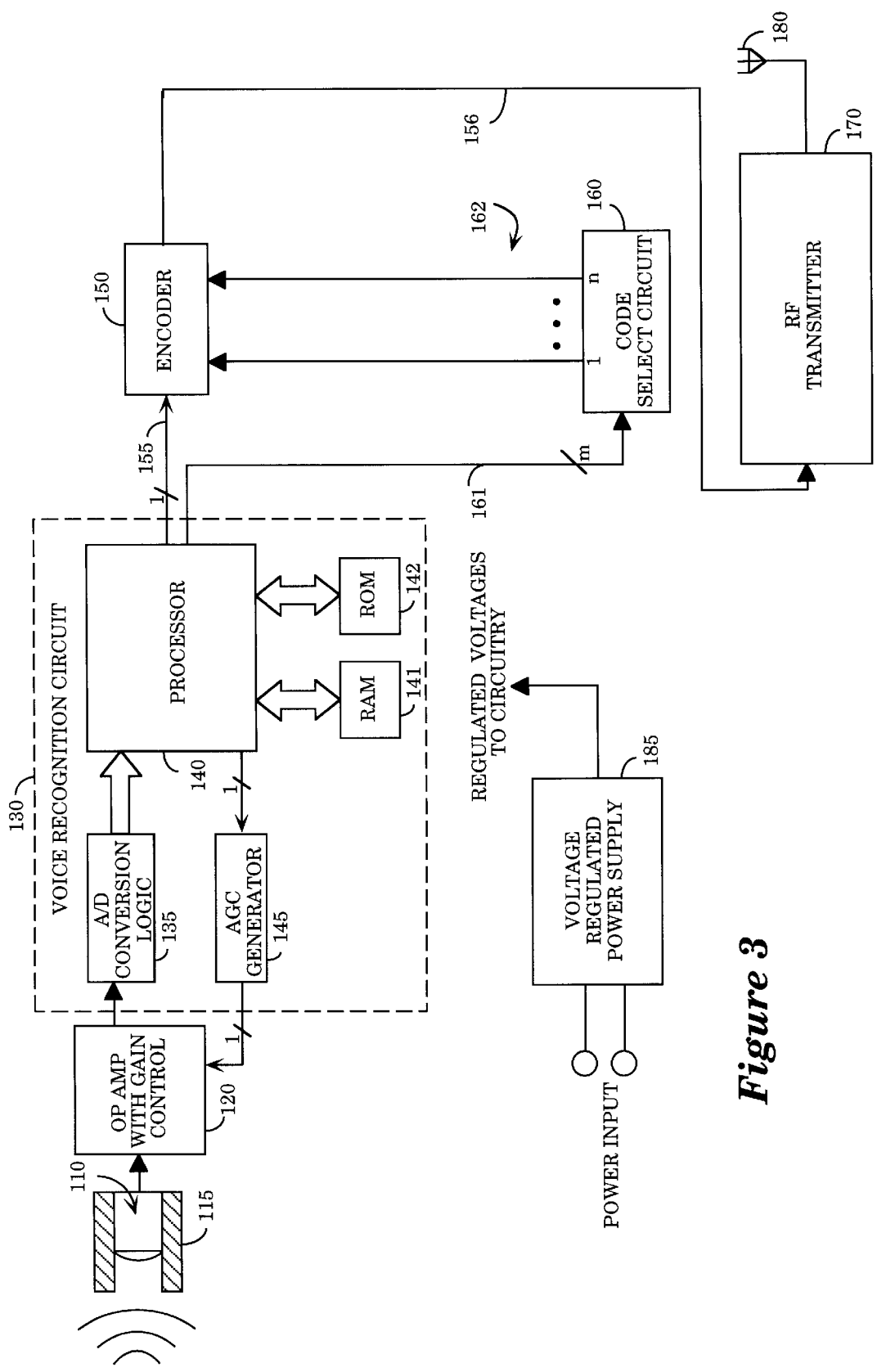
FIG. 3 is a detailed block diagram of the transmitter unit of FIG. 2.

Referring now to FIG. 3, a more detailed embodiment of the voice controlled, speaker independent operator-interacting transmitter unit 100 of FIG. 2 is illustrated. As shown, the microphone 110 detects audio sounds (e.g., a voice command) and converts the audio sounds into an analog signal being a function of the audio. In an effort to filter undesired, extraneous audio noise masking the voice command, the microphone 110 is embedded in an acoustic isolator 115.

The amplifier 120 is coupled to the microphone 110 to receive, amplify and transmit the analog signal into the speaker independent voice recognition circuit 130 manufactured by, for example, OKI Semiconductor (part number MSM6679) or Sensory Circuits, Inc. (RSC-164) which are currently available. The amplifier 120 is preferably an operational amplifier having its gain automatically controlled by the voice recognition circuit 130 to support a wide dynamic audio range.

The voice recognition circuit 130 allows for speaker independent recognition, requiring no preliminary "training" by an end user. The voice recognition circuit 130 includes an analog-to-digital converter 135, a digital processor 140, random access memory ("RAM") 141, read only memory ("ROM") 142 and an automatic gain control ("AGC") circuit 145 providing automatic gain control of the amplifier 120 as previously mentioned. The amplified analog signal is received from the amplifier 120 and digitized by the analog-to-digital converter 135 to produce a digital voice signal. The digital voice signal is transferred in parallel to the voice recognition processor, collectively being the digital processor 140, RAM 141 and ROM 142, which determines whether the digital voice signal is identical to any digitized standard voice commands stored in ROM 142. Such determination is made by a speech algorithm also stored in ROM 142.

Upon determining that the voice command is a recognized voice command, the voice recognition processor 140 generates a unique control output code to the code select circuit 160 via "m" control lines 161, where "m" is an arbitrary whole number depending on the number of standard voice commands supported by the voice recognition processor. The code select circuit 160 converts the control output code into a digital code of "n" bits (where "n" is an arbitrary whole number) as shown in FIG. 4.

Figure 4:
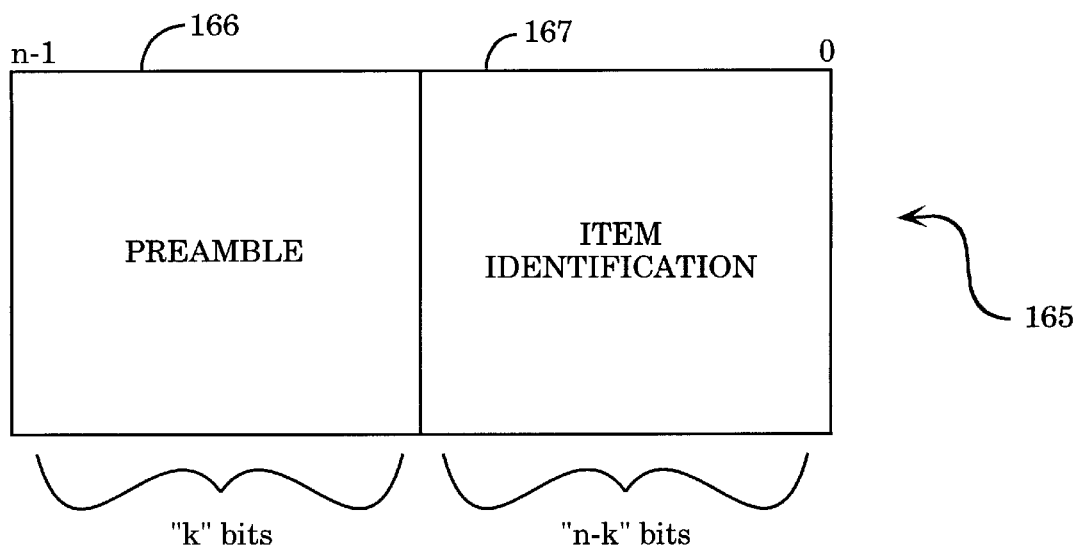
FIG. 4 is an illustrated block diagram of a digital code transmitted from the code select circuit to the encoder as shown in FIGS. 2 and 3.

In FIG. 4, the most significant "k" bits of the digital code 165 are reserved for a preamble 166, which is used to identify its transmitter unit in order to avoid mistaken activation of receiver units unrelated to this particular transmitter unit. As shown, "k" represents an arbitrary number of bits less than "n". The least significant "n-k" bits are reserved for item identification 167 to distinguish between different receiver units having different digital codes.

Referring back to FIG. 3, the digital code is transmitted in parallel through "n" control lines 162 to the encoder 150. Concurrently, the voice recognition processor transmits an active enable signal by asserting an enable line 155, coupled to the encoder 150, to indicate that the digital code is being placed on control lines 162.

The encoder 150 receives the enable signal and the digital code and in response produces a serial bit stream along output line 156 to the RF transmitter 170. The RF transmitter 170 is a frequency modulated crystal controlled RF oscillator which outputs a frequency modulated, coded RF carrier signal to the antenna 180. The antenna 180 is preferably a simple monopole to transmit the coded RF carrier signal for a predetermined period of time for coverage about 360 degrees.

Referring still to FIG. 3, a power supply 185 provides the necessary filtering and voltage regulation for the circuitry within the transmitter unit 100. Typically, the power supply receives 110 volts alternating current ("AC") power from a wall-socket and regulates the AC power to an acceptable DC power level. It is contemplated, however, that the power supply 185 may be battery powered if desired.

Figure 5:
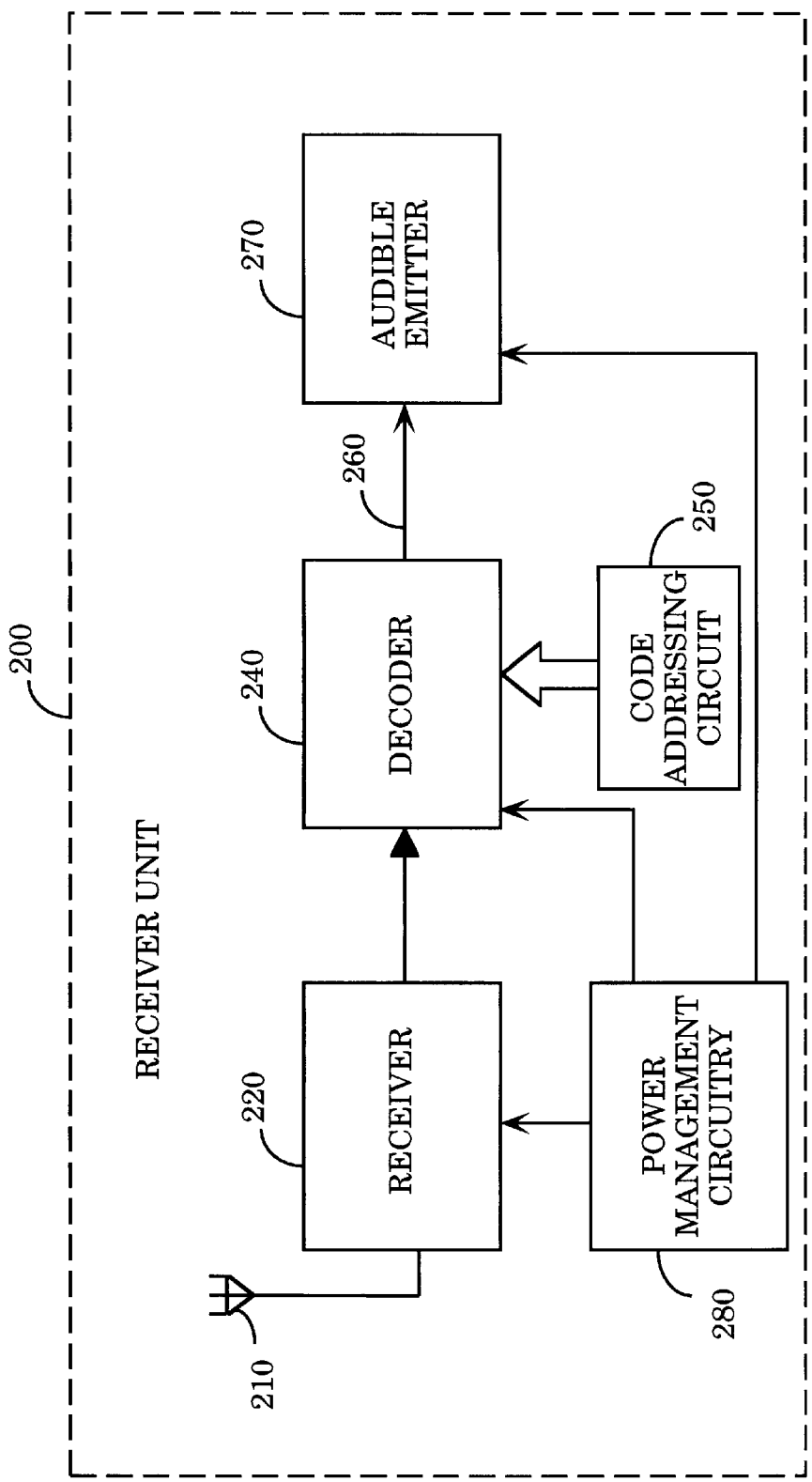
FIG. 5 is an illustrative block diagram of the receiver unit of FIG. 1 including a receiver, decoder, audible emitter, code addressing circuit and power management circuitry.

Referring to FIG. 5, the receiver unit 200 comprises an antenna 210, a receiver 220, a decoder 240, a code addressing circuit 250, an audible emitter 270 and power management circuitry 280. The coded RF carrier signal emitted by the transmitter unit 100 is received by the receiver unit 200 via the antenna 210 of the receiver 220. The receiver 220 demodulates the coded RF carrier signal to produce a bit stream identical to the serial bit stream transmitted by the encoder 150 of FIGS. 2 and 3. The bit stream is input into the decoder 240 which compares the bit stream to an assigned digital code stored within the code addressing circuit 250. The digital code is factory preset.

If the decoder 240 determines that the bit stream and the assigned digital code are identical, the receiver unit 200 has formally recognized that the coded RF carrier signal is directed to the receiver unit 200 and asserts a control line 260, coupled to the audible emitter 270, causing the audible emitter 270 to emit an audible tone for a preselected period of time. The power management circuitry 280 is used to extend battery life of the receiver unit 200 by strobing the receiver 220 at a low duty cycle. If the coded RF carrier signal is received when the power management circuitry 280 is strobing the receiver 220, the power management circuitry 280 will continue to power the receiver 220, decoder 240 and audible emitter 270. However, if no coded RF carrier signal is received during the strobe, the power management circuit 280 disconnects power until the next strobe cycle. Thus, the transmitter unit has to transmit the coded RF signal for a sufficient duration exceeding at least one and preferably multiple strobe cycles of the power management circuit 280.

Figure 6:
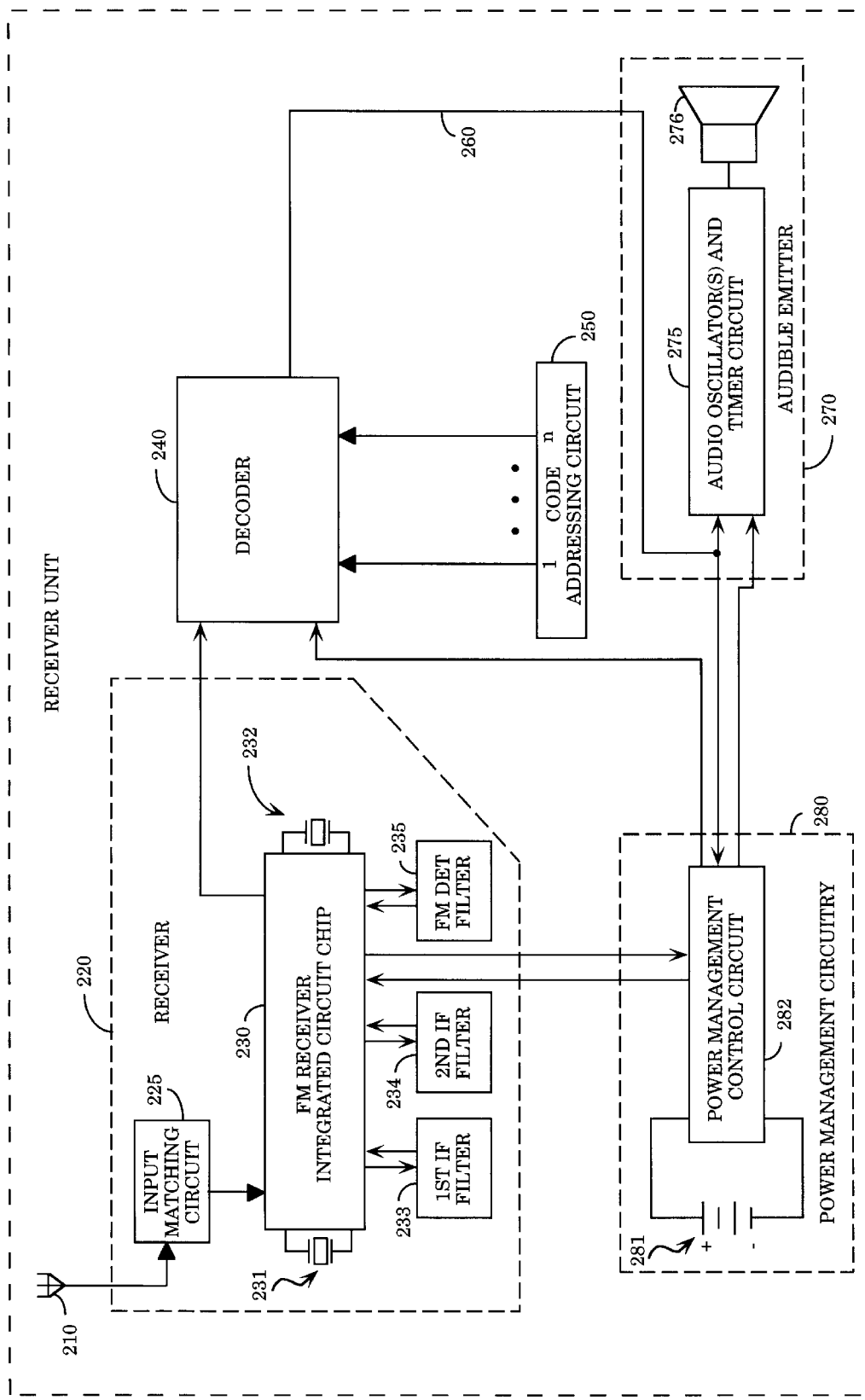
FIG. 6 is a detailed block diagram of the receiver unit of FIG. 4.

Referring now to FIG. 6, the receiver unit 200 of the voice-activated location system is illustrated in greater detail. Upon the antenna 210 receiving the frequency modulated, coded RF carrier signal from the transmitter unit, it is transferred into the receiver 220. The receiver 220 includes an input matching circuit 225, a frequency modulated receiver 230 which is a well-known integrated circuit chip such as Motorola MC3362 or other such devices, intermediate frequency ("IF") filters 233–234 and a FM detector filter 235. The input matching circuit 225 matches the impedance of the antenna 210 to the requirements of the frequency modulated receiver 230. This is necessary because the antenna is compact and therefore, will not support a particular wave length.

The frequency modulated receiver 230 is preferably a dual conversion FM receiver to selectively filter the incoming coded RF carrier signal although a single conversion FM receiver may be used. The frequency modulated receiver 230, namely a mixer driven by a first local oscillator crystal 231, converts the coded RF carrier signal into a signal having a first intermediate frequency (IF) which is filtered through a first IF filter 233. Next, the output of the first IF filter 233 is amplified and input into another mixer within the frequency modulated receiver 230 (not shown) driven by a second local oscillator crystal 232 to produce a signal having a second intermediate frequency. The output of this mixer drives a second IF filter 234, whose bandpass characteristics are narrower than the first IF filter 233 for added selectivity within the receiver 220. The output of the second IF filter 234 feeds a limiter circuit (not shown) internal to the frequency modulated receiver 230. The output of the limiter circuit is input into a quadrature detector, also internal to the frequency modulated receiver 230. The quadrature detector connects to the FM detector filter 235. The resultant circuit provides demodulation of the IF signal. The demodulated signal at the output of the quadrature detector is the recovered serial bit stream that was transmitted by the transmitter unit. The serial bit stream is fed into the decoder 240.

The decoder 240 receives the serial bit stream as an incoming code, converts the incoming code into a parallel format and compares it to the preselected code assigned to the receiver unit 200 that is stored within the code addressing circuit 250. If the incoming code matches the preselected code of this particular receiver unit, the control line 260 is asserted (i.e., changes state) thus activating an audio oscillator and timer circuit 275 of the audible emitter 270. The audio oscillator 275 drives an audio transducer 276 which emits an audible tone from the receiver unit 200. The audible tone thus aids the finding of the misplaced item having the receiver unit 200. The timer circuit portion of the audible emitter 270, however, terminates emission of the audible tone after a given number of seconds in order to conserve battery power. Although not shown, it is contemplated that the receiver unit 200 may include a shut-off button as an additional mechanism to terminate emissions of the audible tone.

To further conserve battery power of an internal battery 281, the power management control circuit 282 strobes the receiver 220 on and off, where the duty cycle has been set to conserve battery power. The strobing continues, providing the receiver 220 is not receiving a coded RF carrier signal. If the receiver 220 is receiving a coded RF carrier signal, the power management circuitry 280 stops strobing and continues to apply power to the receiver 220 until the decoder 240 has confirmed that it has received a bit stream whose code matches the preselected code. Upon receiving a code match, the control line 260 becomes asserted, the control line 260 deactivates the receiver 220 and the power management circuitry 280 returns to its strobe mode. If the code does not match after a predetermined time, the power management circuit 280 automatically returns to its strobe mode.

Figure 7A:
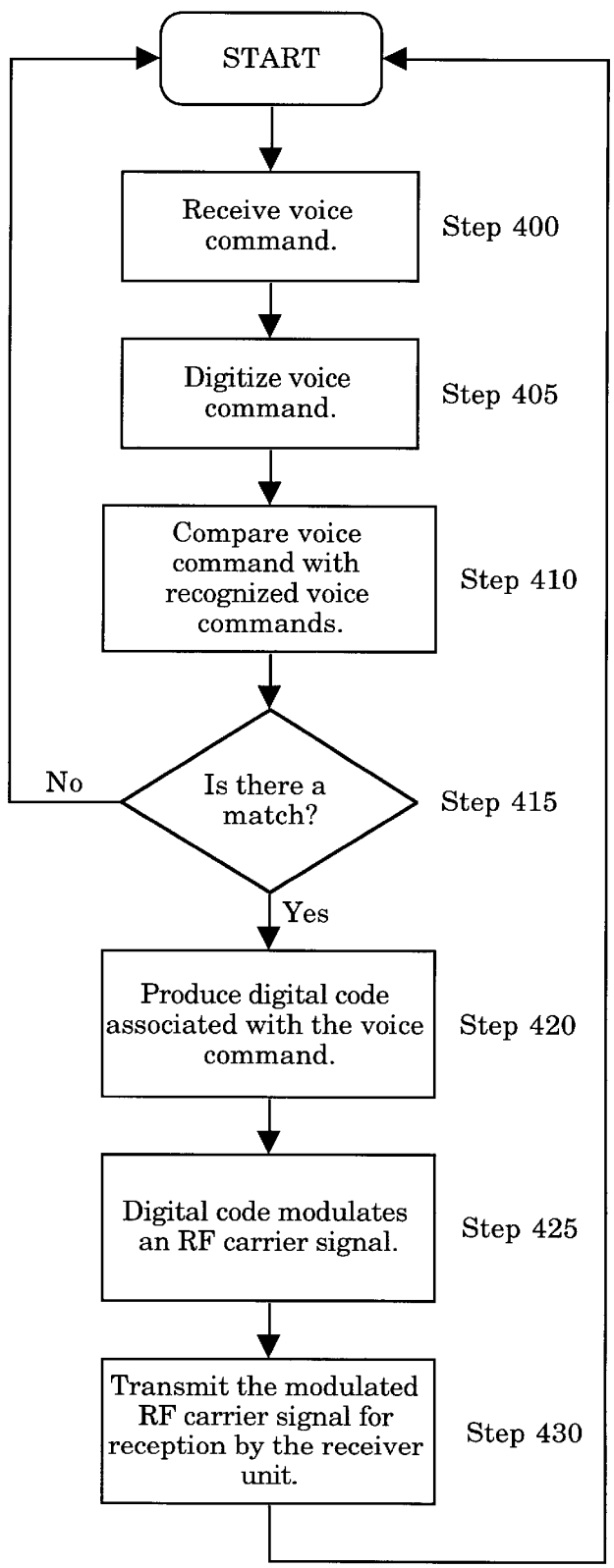
FIGS. 7a and 7b are flowcharts illustrating the operations of the voice-activated location system.

It is contemplated that the functions associated with the transmitter unit 100 and receiver unit 200 could be emulated through other mechanisms (e.g., computer systems with software emulation) by performing the following operations. As shown in FIG. 7a, audio sounds, including a voice command, are received by a transmitting unit which is able to transmit coded RF carrier signals (Step 400). The voice command is subsequently transformed to a digital signal which is compared with a number of internally-stored "recognized" voice commands (Steps 405 and 410). If a match exists, a digital code associated with a receiver unit requested by the voice command is selected and subsequently converted into a modulated RF carrier signal (Steps 420–430) which in turn, is transmitted. Otherwise, the transmitter unit disregards the voice command (Step 435). Upon completion of the transmission, the system reverts back to the listening mode (Step 400).

Figure 7B:
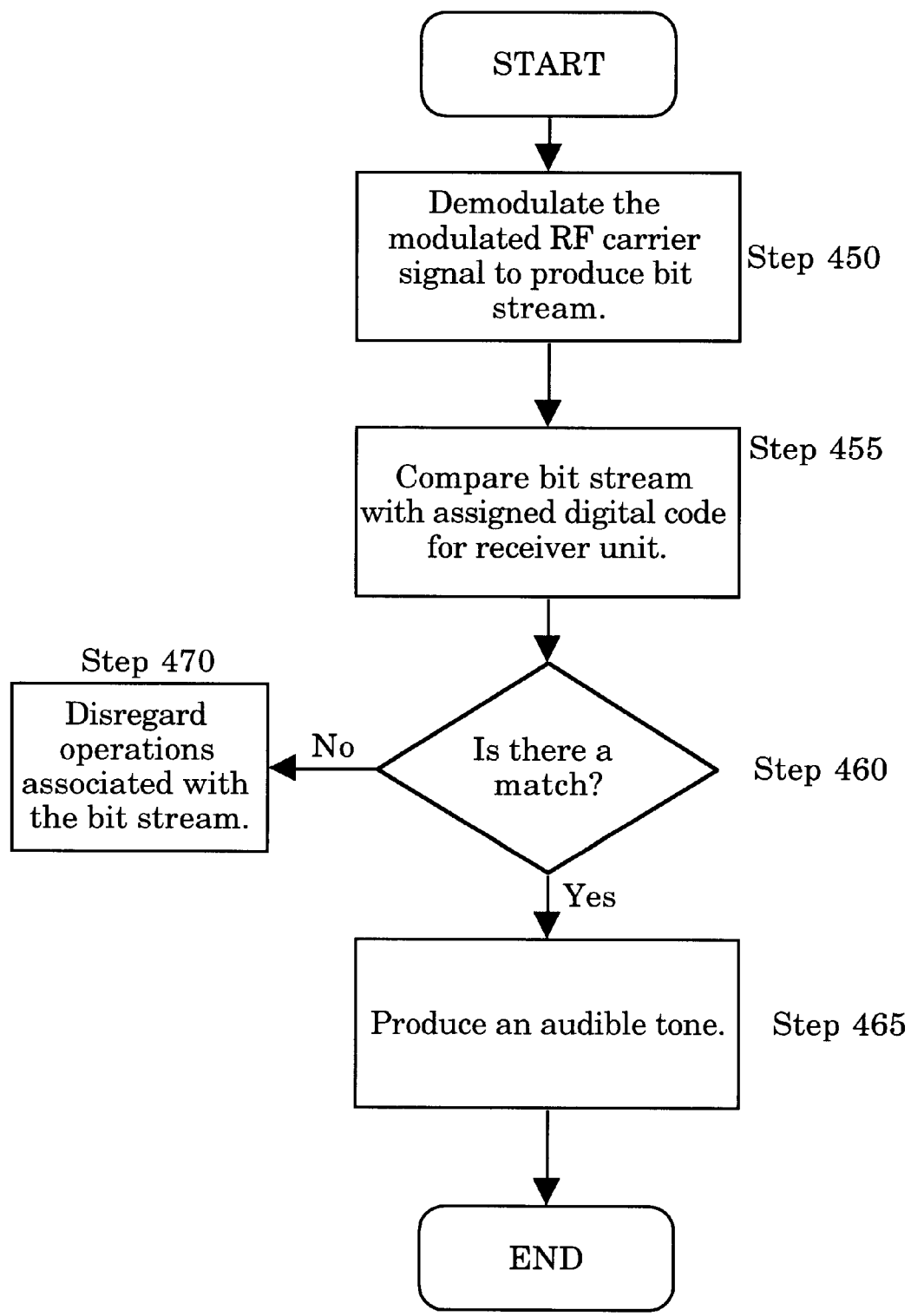

As shown in FIG. 7b, the receiver unit demodulates the modulated RF carrier signal to produce a bit stream (Step 450). The bit stream is compared with an assigned digital code preset into the receiver unit (Step 455). If bit stream and assigned digital code match, the receiver unit produces an audible tone to allow a person to locate the misplaced item having the receiver unit (Steps 460–465). Otherwise, the signal is ignored (Step 470).

The voice-activated location device disclosed herein can support a number of receiver units used in conjunction with one transmitter. Each receiver unit would be assigned a unique code corresponding to a particular spoken voice command. Within the context of the spoken command an item would be identified. The identified item is attached to that particular receiver unit. It is also evident that other embodiments of the present invention may be used without departing from the spirit and scope of the present invention to support different integrated circuits and/or discrete devices and circuits or functional modules, or components from different manufacturers. It is also evident that other well-known modulation techniques such as, for example, amplitude modulation can be utilized to perform the data transmission. The invention should, therefore, be measured in terms of the claims which follows.

What is claimed is:

1. A voice-activated location system for locating misplaced items, comprising:

a transmitter unit to receive an audio sound, to recognize said audio sound represents a voice command, and to produce a control output code, the transmitter unit including a code select circuit to produce a digital code having a first portion and a second portion in response to said control output code, said first portion of said digital code identifying said transmitter unit, said transmitter unit to transmit said digital code; and a receiver unit in communication with the transmitter unit and coupled to an item, said receiver unit to (i) receive said digital code, (ii) determine whether said receiver unit is configured to operate exclusively with said transmitter unit by reading said first portion of said digital code, and (iii) emit an audible tone in response to a determination that said transmitter unit is configured to operate exclusively with said receiver unit, said audible tone being generated in a period determined by a timer.

2. The voice-activated location system according to claim 1, wherein said transmitter unit includes a microphone configured to receive said audio sound and convert said audio sound into an analog signal; and a voice recognition circuit configured to digitize said analog signal to produce a digital signal, to compare said digital signal to at least one recognized voice command and to transmit a control output code through a control output line if said digital signal is substantially identical to said at least one recognized voice command.

3. The voice-activated location system according to claim 2, wherein said voice recognition circuit includes a digital processor coupled to random access memory and read only memory.

4. The voice-activated location system according to claim 3, wherein said read only memory stores said at least one recognized voice command.

5. The voice-activated location system according to claim 2, wherein said transmitter unit further includes an encoder configured to convert said digital code into a serial bit stream, said encoder is coupled to said voice recognition circuit and said code select circuit; and a transmitter, coupled to said encoder, configured to convert said serial bit stream into said at least coded signal and to transmit said at least one coded signal.

6. The voice-activated location system according to claim 5, wherein said transmitter unit further includes an amplifier, coupled to said microphone and said voice recognition circuit, configured to receive said analog signal from said microphone, amplify said analog signal and transmit said amplified analog signal to said voice recognition circuit.

7. The voice-activated location system according to claim 1, wherein said first portion of said digital code produced by said code select circuit includes a first plurality of bits defining a preamble segment identifying the transmitter unit and said second portion of said digital code produced by said code select circuit includes a second plurality of bits defining an item identification segment identifying one of a plurality of receiver units capable of being used in communication with the transmitter unit.

8. The voice-activated location system according to claim 1, wherein said receiver unit includes a receiver configured to receive said at least one coded signal and to demodulate said at least one coded signal to produce said serial bit stream;

a decoder, coupled to said receiver, configured to receive said serial bit stream, to compare said serial bit stream to an assigned digital code in order to determine whether said at least one coded signal is targeting said receiver unit and to signal an audible emitter to emit said audible tone by asserting a control input line if said serial bit stream and said assigned digital code are identical; and said audible emitter, coupled to said decoder via said control input line, configured to emit said audible tone upon assertion of said control input line.

9. The voice-activated location system according to claim 8, wherein said receiver unit further includes power management circuitry.

10. The voice activated location system according to claim 1, wherein said second portion of said control code identifies one of a plurality of receiver units, said receiver unit emits an audible tone of said second portion of said control code matches a receiver unit identification code.

11. The voice activated location system according to claim 1, wherein said item is a remote control unit.

12. The voice activated location system according to claim 11, wherein said receiver unit is integrated within the remote control unit.

13. A voice-activated location system comprising:

transmitter means for (i) receiving an audio sound, (ii) recognizing that said audible sound represents a voice command and (iii) producing a control output code, said transmitter means including code select means for producing and transmitting a digital code having a first portion and a second portion in response to said control output code, said first portion of said digital code identifying said transmitter means; and receiver means in communication with said transmitter means and coupled to a remote control, said receiver means for (i) receiving said digital code, (ii) determining whether said receiver means is configured to operate with said transmitter means by reading said first portion of said digital code, and (iii) emitting an audible tone in response to a determination that said transmitter means is configured to operate exclusively with said receiver means in order to identify a location of said remote control, said audible tone being generated in a period determined by a timer.

14. The voice-activated location system according to claim 13, wherein said transmitter means includes:

recording means for receiving said audio sound and for converting said audible sound into an analog signal; and voice recognition means for digitizing said analog signal producing a digital signal, comparing said digital signal to at least one recognized voice command and transmitting a control output code through a control output line if said digital signal is substantially identical to said at least one recognized voice command.

15. The voice-activated location system according to claim 14, wherein said voice recognition means includes a digital processor coupled to random access memory and read only memory.

16. The voice-activated location system according to claim 15, wherein said read only memory stores said at least one recognized voice command.

17. The voice-activated location system according to claim 14, wherein said transmitter means further includes encoding means for converting said digital code into a serial bit stream, said encoding means is coupled to said voice recognition means and said code select means; and outputting means, coupled to said encoding means, for converting said serial bit stream into said at least one coded signal and for transmitting said at least one coded signal.

18. The voice-activated location system according to claim 17, wherein said transmitter means further includes amplifying means, coupled to said recording and said voice recognition means, for receiving said analog signal from said recording means, for amplifying said analog signal and for transmitting said amplified analog signal to said voice recognition means.

19. The voice-activated location system according to claim 13, wherein said receiver means includes receiving means for obtaining said at least one coded signal and for demodulating said at least one coded signal to produce said serial bit stream;

decoding means, coupled to said receiving means, for receiving said serial bit stream, for comparing said serial bit stream to a digital code in order to determine whether said at least one coded signal is targeting said receiver means and for asserting a control input line if said serial bit stream and said digital code are identical; and emitting means, coupled to said decoding means via said control input line, for emitting said audible tone upon assertion of said control input line.

20. The voice-activated location system according to claim 19, wherein said receiver means further includes power management means for managing power consumption of said receiving means, decoding means and emitting means.

* * * * *